United States Patent [19]
Atobe

[11] Patent Number: 4,666,101
[45] Date of Patent: * May 19, 1987

[54] LEVEL WINDER FOR DOUBLE-BEARING REEL

[75] Inventor: Takashi Atobe, Tokyo, Japan

[73] Assignee: Daiwa Seiko Inc., Tokyo, Japan

[*] Notice: The portion of the term of this patent subsequent to Dec. 10, 2002 has been disclaimed.

[21] Appl. No.: 751,249

[22] Filed: Jul. 2, 1985

Related U.S. Application Data

[63] Continuation-in-part of Ser. No. 617,745, Jun. 6, 1984, Pat. No. 4,557,429.

[30] Foreign Application Priority Data

Jul. 13, 1984 [JP] Japan .......................... 59-106313[U]

[51] Int. Cl.$^4$ .................... A01K 89/04; A01K 89/015
[52] U.S. Cl. ................................................. 242/84.42
[58] Field of Search ............... 242/84.4, 84.42, 157 R, 242/158 R, 158.3, 221

[56] References Cited

U.S. PATENT DOCUMENTS

| | | | |
|---|---|---|---|
| 1,345,072 | 6/1920 | Case | 242/84.42 |
| 1,554,132 | 9/1925 | Schmid | 242/84.42 |
| 2,689,694 | 9/1954 | Hunter | 242/157 R |
| 3,111,287 | 11/1963 | Baenziger | 242/84.42 |
| 4,557,429 | 12/1985 | Atobe | 242/84.42 |

FOREIGN PATENT DOCUMENTS

| | | | |
|---|---|---|---|
| 671216 | 2/1939 | Fed. Rep. of Germany | 242/84.42 |
| 21220 | 9/1965 | Japan | 242/84.42 |
| 161729 | 12/1957 | Sweden | 242/84.42 |

Primary Examiner—Billy S. Taylor

[57] ABSTRACT

A level winder for a double-bearing reel for a fishing rod consists of a traverse cam shaft held between portions of frame bases on side walls in front of a spool. The cam shaft is rotated by a driving gear mounted on a handle shaft and includes a guide cylinder mounted around an outer portion of the traverse cam shaft, and rotatably supported between the frame bases. A slidable member is mounted around the guide cylinder and moves reciprocally along the guide cylinder in a lateral direction. A locking recess is formed at a front portion of the slidable member and includes smooth guide surfaces formed on portion of the slidable member on either side of the locking recess; notches formed in upper portions of the locking recess; a pair of upper and lower guide rods supported between the side walls; right and left line guide arms mounted slidably on the guide rods and urged resiliently in opposite directions by a spring; and locking pins projecting from rear portions of the line guide arms, being retractable into the line guide arms and engaging with the locking recess so that a fishing line guide portion is formed between the two line guide arms; the locking pins being dispensed from the locking recess through the notches when the slidable member is rotated.

4 Claims, 5 Drawing Figures

LEVEL WINDER FOR DOUBLE-BEARING REEL

This application is a continuation-in-part application Ser. No. 617,745, filed June 6, 1984, now U.S. Pat. No. 4,557,429.

BACKGROUND OF THE INVENTION

1. Field of the Invention

This invention relates to an improvement to a level winder for a reel of a fishing rod.

2. Description of the Prior Art

In a fishing line guide member of a conventional level winder for a reel of a fishing rod, the line is let out through a line guide hole in the line guide member while the line is being payed out, and the frictional resistance generated when the line passes through the guide hole increases and hinders the paying out of the line. As a result, the performance of the reel when casting a lure at a distance is reduced, and it is difficult to cast the lure to a predetermined point accurately.

A known level winder of this kind has been designed with a view to eliminating these inconveniences, it is disclosed in Japanese Patent Publication No. 21,220/1965. In this level winder, a line guide member consisting of right and left line guide arms and a slidable element is so formed that the guide arms can be separated from the slidable element, and a line guide hole is adapted to be opened while paying out lines, so that the frictional resistance due to the guide hole is thereby reduced.

When the right and left line guide arms of this device are separated from the slidable element, the guide arms are ready to move freely along guide rods. The guide arms are moved by the tensile force in the line, so that the line guide hole is opened. However, when the lure is cast, the reel is not kept precisely horizontal but is continuously tilting in the longitudinal and lateral directions. Therefore, the two line guide arms move along the guide rods unstably, under their own weight or the inertial force thereof, and come into contact with the line which is being payed out, and thereby generate frictional resistance.

In the level winder of this system, the operation of separating the line guide arms and the slidable element, so that the guide arms move reciprocally in the lateral direction, from each other must be carried out by directly turning the slidable element by hand. This means that the paying out of the line is complicated and troublesome. Moreover, if the slidable element is turned by mistake while winding in the line, the line guide arms are separated, so that the line cannot be guided. The engagement of the guide arms with the slidable element for the winding of the line is done by bringing a traverse cam shaft and the slidable element into frictional contact with each other. Therefore, when the device has been used for a long period of time, the portions of these parts in frictional contact become worn, and extraneous matter such as seawater is deposited on these portions. As a result, a sufficiently high frictional force can not be generated. This hampers the engagement of the guide arms with the slidable element, so that the operation of the device becomes unreliable.

SUMMARY OF THE INVENTION

The present invention has been developed with a view to eliminating these faults. A first characteristic of the present invention resides in that a line guide member is formed of a pair of line guide arms, which are engaged with locking portions of a slidable member and are urged resiliently to the right and left, respectively, by a spring. Accordingly, when the line guide arms are disengaged from the slidable member to enable the casting of a lure, the guide arms are moved in opposite directions by the resilient force of the spring and are supported by frame bases of the side walls of the reel. Thus, even when the reel is not kept exactly horizontal during casting, the two line guide arms are held on the right and left frame bases, and the line is let out smoothly without coming into contact with the guide arms. This ensures that the lure can be cast some distance easily, and to a predetermined point accurately.

A second characteristic of the present invention resides in that the disengaging of the two line guide arms from the slidable member is done in accordance with the operation of a clutch means which can engage with and disengage from a spool shaft. Therefore, when the clutch means is operated in order to pay out the line, the two line guide arms can be held in their open positions automatically and reliably.

An operating cam is mounted on one end portion of a pivotable guide cylinder around which the slidable member is mounted, and an operating arm which can engage with the operating cam is provided on a clutch plate within the clutch means. The guide cylinder is rotated simultaneously with the operation of the clutch means to rotate the locking portions of the slidable member and to disengage the two line guide arms therefrom, so that the guide arms are urged resiliently in opposite directions by the spring.

A third characteristic of the present invention resides in that the slidable member, with which the pair of line guide arms engages, is constantly held in the position in which the guide arms are locked by the spring via the guide cylinder around which the slidable member is mounted. Accordingly, the guide arms can not disengage from the slidable member accidentally during fishing, and thus the line-guiding operation is not interrupted. When the operation of returning the clutch means is performed, the two line guide arms engage the locking portions of the slidable member smoothly and reliably. This means that both the engagement and disengagement of the line guide members and the slidable member, along which the guide members can move reciprocally in the lateral direction, can be done automatically and reliably.

A fourth characteristic of the present invention resides in that the line guide arms are provided with locking pins which project therefrom and can retract thereinto on springs which are also provided in the guide arms. These locking pins can engage a locking recess in the laterally-reciprocal slidable member and are guided by guide surfaces provided on either side of the locking recess. Accordingly, the two line guide arms slide over the guide surfaces and engage the locking recess smoothly, because of the lateral reciprocal movements of the slidable member, to form a line guide hole through which the line can be guided smoothly.

A fifth characteristic of the present invention resides in that since the locking pins disposed on the line guide arms are arranged in such a manner as to engage the locking recess, the line guide arms can be disposed at lower positions and can be made compact, and hence the reel can be made compact as a whole. Therefore, both the fishing rod and the reel can be gripped firmly and stably by the palm, and the line can be taken up easily and smoothly. Furthermore, the reel is easily portable and is not bulky for storage.

The objects as well as other advantageous features of the present invention will become apparent from the following description of a preferred embodiment thereof, with reference to the accompanying drawings.

BRIEF DESCRIPTION OF THE DRAWINGS

FIG. 2 is a partially-cutaway side elevation taken along the line A—A of FIG. 1, showing the level winder when the line is being wound in;

DESCRIPTION OF THE PREFERRED EMBODIMENT

Figure 1:
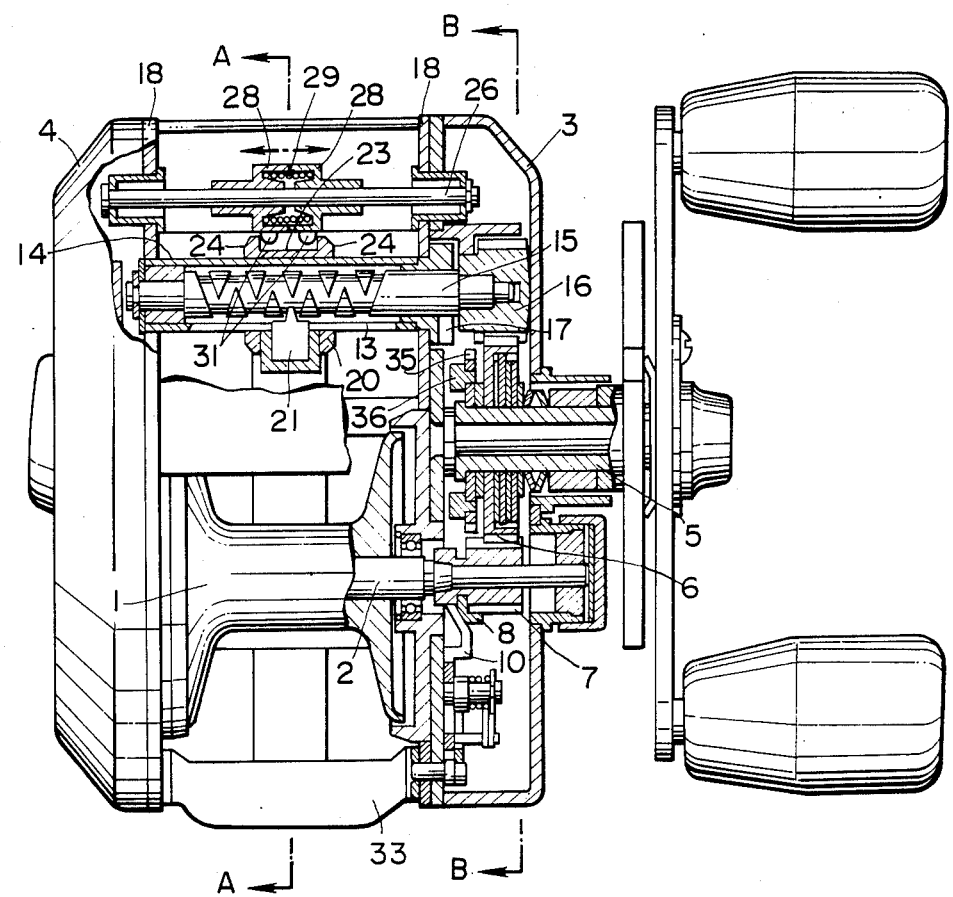
FIG. 1 is a partially-sectioned plan view of the present invention.

An embodiment of the present invention will now be described with reference to the drawings. A spool shaft 2 on which a spool 1 is attached is supported rotatably between a pair of side walls 3, 4 of a reel. A pinion 7, which meshes with a driving gear 6 on a handle shaft 5 in a known manner, is mounted on the portion of the spool shaft 2 which is within one side wall 3 of the reel, in such a manner that the pinion 7 can be connected to or disengaged from the spool shaft 2. An operating plate 8 engaging with the pinion 7 impels the pinion 7 by springs 9, 9 in such a manner that the pinion 7 engages the spool shaft 2.

Figure 2:
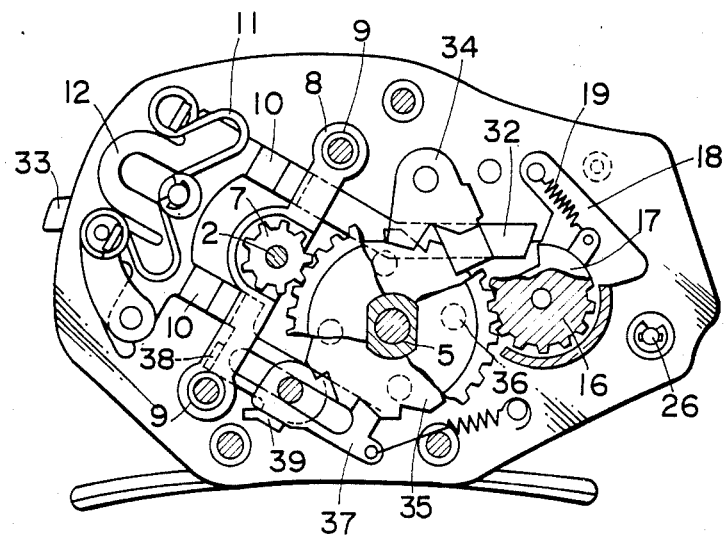
Figure 3:
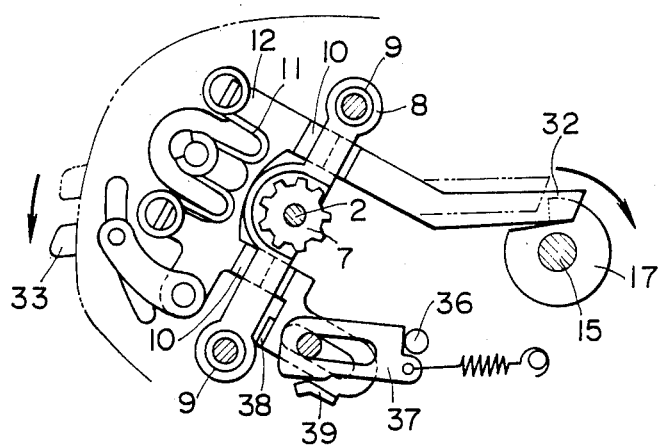
FIG. 3 is a partially-cutaway side elevation of the level winder when the line is being payed out.

A clutch plate 12 provided with operating projections 10, 10, and biased separately to either an inner or an outer position by a dead-point spring 11, is provided slidably on the inner side of the operating plate 8. When the clutch plate 12 is pressed toward the inner position, as shown in FIG. 3, the operating projections 10, 10 press the operating plate 8 outward against the force of the springs 9, 9 to disengage the pinion 7 from the spool shaft 2, so that the line can be payed out. When the clutch plate 12 is in the outer position, as shown in FIG. 2, the pinion 7 is connected to the spool shaft 2, so that the line can be wound in.

A guide cylinder 14 which has a guide hole 13 on the lower side thereof is supported rotatably on front portions of frame bases 18 on the side walls 3, 4 of the reel. A traverse cam shaft 15 fits in the guide cylinder 14, and a small gear 16 meshing with the driving gear 6 is attached to the end of the traverse cam shaft 15 near the side wall 3 of the reel. An operating cam 17 is fixed to the guide cylinder 14 inside the small gear 16, and is pulled by a spring 19 anchored to a frame base 18 of the reel side wall 3, thereby restricting and holding the guide cylinder 14 at a predetermined position.

A slidable member 20 is mounted onto the outer circumferential surface of the guide cylinder 14, and a locking claw 21 provided on the inner side of the slidable member 20 engages with a threaded recess in the traverse cam shaft 15 through the guide hole 13. A locking recess 23, which is provided with notches 22, 22 at the inner end portions thereof which are on the side of the spool, is provided on an upper portion of the slidable member 20. The outer circumferential portions of the slidable member 20 on either side of the locking recess 23 are shaped so as to form smooth guide surfaces 24, 24.

A pair of guide rods 25, 26 are supported between portions of the frame bases which are in front of the guide cylinder 14. Right and left guide arms 28, 28, which are provided with a line guide rod 27 in opposed surfaces thereof, are each fitted around both guide rods 25, 26. A spring 29 is interposed between the guide arms 28, 28 of the guide rod. Locking pins 31 project so that they can be retracted by springs 30 from lower portions of the guide arms 28. When the locking pins 31, 31 engage the locking recess 23, the line guide arms 28, 28 come into contact with each other so that a line is guided by the line guide rods 27, 27 in cooperation with the upper guide rod 25.

Figure 4:
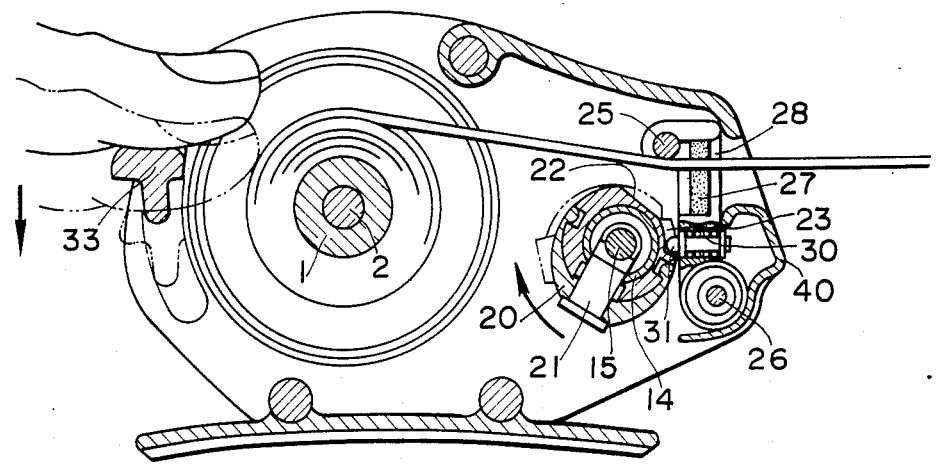
FIG. 4 is a section taken along the line B—B of FIG. 1.
Figure 5:
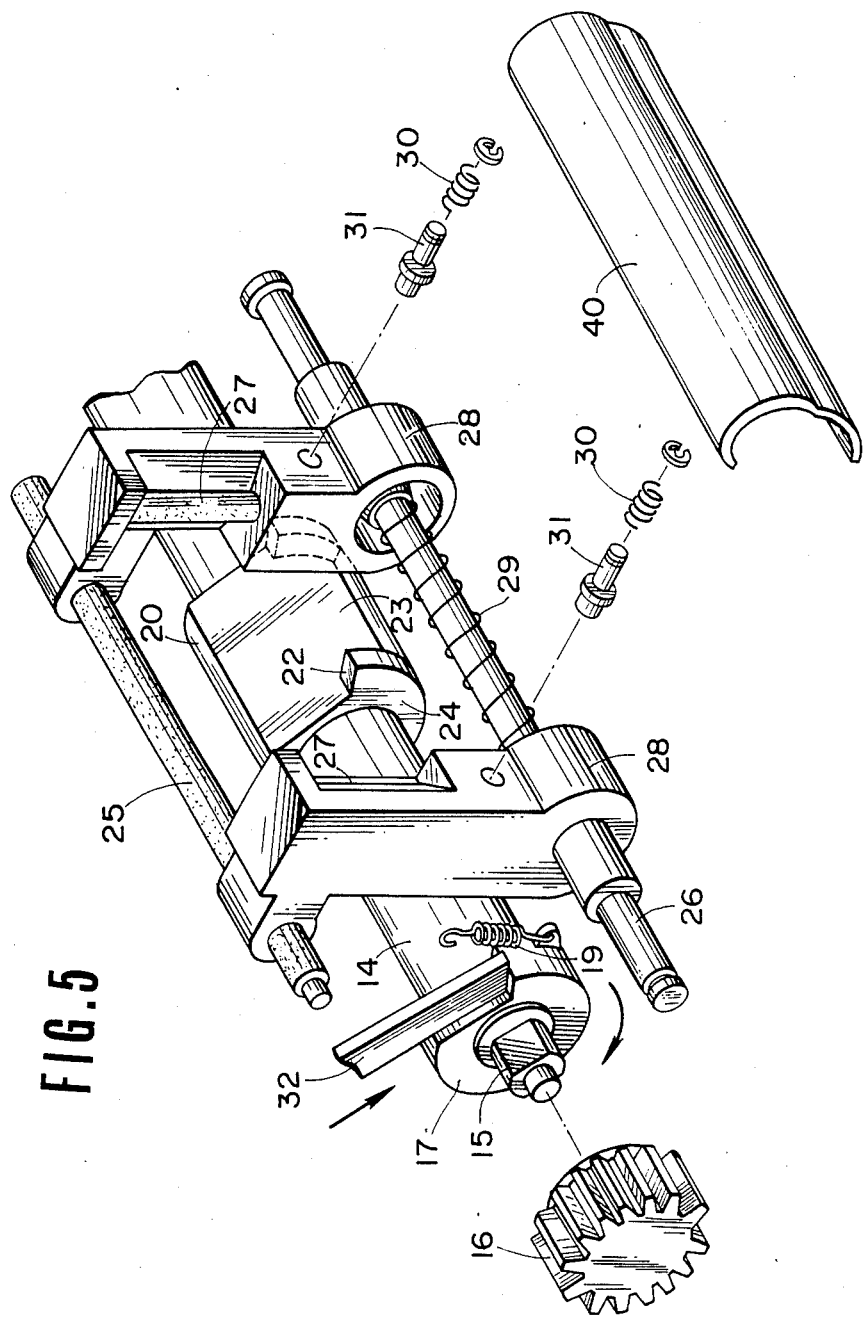
FIG. 5 is a partially-exploded prespective view of the principal portions of the present invention.

An operating arm 32 which can engage with the operating cam 17 is formed integrally with and projects from the end of one side portion of the clutch plate 12. When the clutch plate 12 is pressed toward the inner position to disengage the pinion 7 from the spool shaft 2, the operating arm 32 presses and rotates clockwise the operating cam 17 against the spring 19, so that the slidable member 20 is turned by the guide cylinder 14, as shown in FIG. 4, and the notches 22, 22 in the locking recess 23 release the locking pins 32, 32. As a result, the guide arms 28, 28 are urged resiliently by the spring 29 to the right and left to move the guide arms 28, 28 away from each other toward the frame bases 18, 18.

The clutch plate 12 is so formed that it can be operated by an operating lever 33 which extends between portions of the side walls 3, 4 of the reel behind the spool, in such a manner that the operating lever 33 can move vertically.

A clutch-returning means, which is used to return the clutch plate 12 which has slid to its inner position when the operating lever 35 is pressed down, is so formed that the clutch-returning operation can be carried out automatically in accordance with a rotational movement of the handle shaft 5, in a known manner.

A reverse rotation-preventing ratchet wheel 35, which is rotated unitarily with the handle shaft 5, and which is engaged with a locking pawl 34, is provided with kick pins 36 projecting from the surface thereof. When the handle shaft 5 is rotated and a kick pin 36 engages an operating member 39 and presses it outward until the rear end of the operating member 37 presses against a locking projection 38 of the clutch plate 12 and moves it beyond the dead point of the dead-point spring 11, the clutch plate returns to its outer position. When the clutch plate 12 has returned to its outer position, the operating member 37 is held in a position out of the path of the circular movement of the kick pins 36, as shown in FIG. 2, by a stopper projection 39 provided on the clutch plate 12.

The line guide arms 28, 28 are made of a synthetic resin, and particularly the line guide rod 27 and the upper guide rod 25 on the inner side surface of the guide arms are made of a wear-resistant material such as a ceramic material or stainless steel in order to prevent wear and damage of the line.

A guide cover 40 made of a wear-resistant material such as stainless steel is attached to an outer portion of the lower guide rod 26.

This embodiment of the present invention is formed as described above. In order to pay out the line during fishing, the operating lever 33 of the clutch plate 12 is pressed downward to move the clutch plate 12 to its inner position. Consequently, the operating projections 10, 10 impel the operating plate 8 outward to disengage the pinion 7 from the spool shaft 2, and thereby enable the spool 1 to rotate. At the same time, the operating arm 32 of the clutch plate 12 turns the operating cam 17 to rotate the slidable member 20 by the guide cylinder 14, so that the locking pins 31, 31 provided in the line guide arms 28, 28 and engaged with the locking recess 24 are disengaged therefrom through the notches 22, 22. As a result, the guide arms 28, 28 are moved away from each other by the force of the spring 29 toward the frame bases 18, 18. Accordingly, the line can be paid out without coming into contact with the line guide rod 27 of the line guide arms 28, 28.

When the handle shaft 5 is then rotated in the direction in which the line is wound, the clutch plate 12 is returned to its outer position by the action of the kick pin 36, the operating member 37 and the locking projection 38, so that the pinion 7 is connected to the spool shaft 2 to enable the winding of the line. At the same time, the operating arm 32 is moved back so that the operating cam 17 makes the guide cylinder 14 and the slidable member 20 return to their original positions. During this time, the traverse cam shaft 15 is rotated to make the slidable member 20 move reciprocally in the lateral direction. The slidable member 21 is first moved to one line guide arm 28 so that the corresponding locking pin 31 is retracted by that guide surface 24 of the locking recess 23, and the locking pin 31 engages with the recess 23. The slidable member 20 is then moved to the other line guide arm 28 so that the corresponding locking pin 31 engages the locking recess 23 over that guide surface 24 in the same manner. Consequently, the line guide arms 28, 28 are connected so that the line is stored and guided as it is wound onto the spool 1.

The position of the clutch-operating lever 33 and the construction of the clutch means and clutch-returning means are not limited to those specified in this embodiment.

What is claimed is:

1. In a double-bearing reel for a fishing rod, said reel having side walls, frame bases on said side walls and a handle shaft, and including:
   a spool shaft supported rotatably between said side walls of said reel and having a spool attached therearound;
   a driving gear on said handle shaft;
   a pinion mounted on one end portion of said spool shaft, for meshing with said driving gear, said pinion engaging with, and disengaging from, said spool shaft;
   clutch means for causing said pinion to unitarily engage with, and disengage from, said spool shaft; and
   clutch-returning means for actuating said clutch means in the interlocking arrangement when said handle shaft is rotated in the direction in which a fishing line is wound in, whereby said pinion that has been disengaged from said spool shaft can be unitarily engaged with said spool shaft;
   a level winder comprising:
      a traverse camshaft held between portions of said frame bases on said side walls in front of said spool, said traverse camshaft being rotated by said driving gear mounted on said handle shaft;
      a guide cylinder mounted around an outer portion of said traverse camshaft, and rotatably supported between said frame bases;
      a slidable member mounted around said guide cylinder, for rotating unitarily with said guide cylinder and moving reciprocally along guide cylinder in a lateral direction;
      a locking recess formed at a front portion of said slidable member;
      smooth guide surfaces formed on portions of said slidable member on either side of said locking recess;
      notches formed in upper portions of said locking recess; a pair of upper and lower guide rods supported between said side walls;
      right and left line guide arms mounted slidably on said said guide and urged resiliently in opposite directions by a spring; and
      locking pins projecting from rear portions of said line guide arms, said locking pins being retractable into said line guide arms and engaging with said locking recess so that a fishing line guide portion is formed between said two line guide arms;
      said locking pins being disengaged from said locking recess through said notches when said slidable member is rotated.

2. In a double-bearing reel for a fishing rod, said reel having side walls, frame bases on said side walls and a handle shaft, and including:
   a spool shaft supported rotatably between said side walls of said reel and having a spool attached therearound;
   a driving gear on said handle shaft;
   a pinion mounted on one end portion of said spool shaft, for meshing with said driving gear, said pinion engaging with, and disengaging from, said spool shaft;
   clutch means for causing said pinion to unitarily engage with, and disengage from, said spool shaft; and
   clutch-returning means for actuating said clutch means in an interlocking arrangement when said handle shaft is rotated in the direction in which a fishing line is wound in, whereby said pinion that has been disengaged from said spool shaft can be unitarily engaged with said spool shaft;
   a level winder comprising:
      a traverse camshaft held between portion of said frame bases on said side walls in front of said spool, said traverse camshaft being rotated by said driving gear mounted on said handle shaft;
      a guide cylinder mounted around an outer portion of said traverse camshaft, and rotatably supported between said frame bases;
      a slidable member mounted around said guide cylinder, for rotating unitarily with said guide cylinder and moving reciprocally along said guide cylinder in a lateral direction;
      a locking recess formed at a front portion of said slidable member;
      a pair of guide rods supported between said side walls;
      right and left line guide arms mounted on said guide rods and urged resiliently in opposite directions by a spring;
      locking pins projecting from rear portions of said line guide arms, said locking pins being retractable into said line guide arms and engaging with said locking recess so that a fishing line guide portion is formed between said two line guide arms;

notches formed in upper portions of said locking recess so that said locking pins of said line guide arms disengage from said locking recess when said slidable member is rotated;

an operating cam provided at one end portion of said guide cylinder; and a clutch provided within said clutch means, and having an operating arm;

said operating arm engageable with said operating cam when said pinion connected to said spool is disengaged therefrom, thereby to turn said guide cylinder and to simultaneously provide a clutch means operating action and a guide arm opening action.

3. In a double-bearing reel for a fishing rod, said reel having side walls, frame bases on said side walls and a handle shaft, and including:

a spool shaft supported rotatably between said side walls of said reel and having a spool attached therearound;

a driving gear on said handle shaft;

a pinion mounted on one end portion of said spool shaft, for meshing with said driving gear, said pinion engaging with, and disengaging from said spool shaft;

clutch means for causing said pinion to unitarily engage with, and disengage from, said spool shaft; and clutch-returning means for actuating said clutch means in the interlocking arrangement when said handle shaft is rotated in the direction in which a fishing line is wound in, whereby said pinion that has been disengaged from said spool shaft can be unitarily engaged with said spool shaft;

a level winder comprising:

a traverse camshaft held between portions of said frame bases on said side walls forwardly of said spool, said traverse camshaft being rotated by said driving gear mounted on said handle shaft;

a guide cylinder mounted around an outer portion of said traverse camshaft, and rotatably supported between said frame bases;

a slidable member mounted around said guide cylinder, for rotating unitarily with said guide cylinder and moving reciprocally along said guide cylinder in a lateral direction;

a locking recess formed at a forward portion of said slidable member;

smooth guide surfaces formed on portions of said slidable member on either side of said locking recess;

notches formed in upper portions of said locking recess;

a pair of upper and lower guide rods supported between said side walls;

right and left line guide arms mounted slidably on said guide rods and urged resiliently in opposite directions by a spring; and locking pins projecting rearwardly from rear portions of said line guide arms toward said guide cylinder, said locking pins being retractable into said line guide arms and engaging with said locking recess so that a fishing line guide portion is formed between said two line guide arms;

said locking pins being disengaged from said locking recess through said notches when said slidable member is rotated.

4. In a double-bearing reel for a fishing rod, said reel having side walls, frame bases on said side walls and a handle shaft, and including:

a spool shaft supported rotatably between said side walls of said reel and having a spool attached therearound;

a driving gear on said handle shaft;

a pinion mounted on one end portion of said spool shaft, for meshing with said driving gear, said pinion engaging with, and disengaging from, said spool shaft;

clutch means for causing said pinion to unitarily engage with, and disengage from, said spool shaft; and clutch-returning means for actuating said clutch means in an interlocking arrangement when said handle shaft is rotated in the direction in which a fishing line is wound in, whereby said pinion that has been disengaged from said spool shaft can be unitarily engaged with said spool shaft;

a level winder comprising:

a traverse camshaft held between portions of said frame bases on said side walls forwardly of said spool, said traverse camshaft being rotated by said driving gear mounted on said handle shaft;

a guide cylinder mounted around an outer portion of said traverse camshaft, and rotatably supported between said frame bases;

a slidable member mounted around said guide cylinder, for rotating unitarily with said guide cylinder and moving reciprocally along said guide cylinder in a lateral direction;

a locking recess formed at a forward portion of said slidable member;

a pair of guide rods supported between said side walls;

right and left line guide arms mounted on said guide rods and urged resiliently in opposite directions by a spring;

locking pins projecting rearwardly from rear portions of said line guide arms toward said guide cylinder, said locking pins being retractable into said line guide arms and engaging with said locking recess so that a fishing line guide portion is formed between said two line guide arms;

notches formed in upper portions of said locking recess so that said locking pins of said line guide arms disengage from said locking recess when said slidable member is rotated;

an operating cam provided at one end portion of said guide cylinder; and a clutch plate provided within said clutch means, and having an operating arm;

said operating arm engageable with said operating cam when said pinion connected to said spool is disengaged therefrom, thereby to turn said guide cylinder and to simultaneously provide a clutch means operating action and a guide arm opening action.

* * * * *